United States Patent [19]
Bergervoet

[11] Patent Number: 5,400,241
[45] Date of Patent: Mar. 21, 1995

[54] HIGH FREQUENCY DISCHARGE LAMP

[75] Inventor: Jozef R. M. Bergervoet, Eindhoven, Netherlands

[73] Assignee: U.S. Philips Corporation, New York, N.Y.

[21] Appl. No.: 148,104

[22] Filed: Nov. 3, 1993

[30] Foreign Application Priority Data

Nov. 26, 1992 [EP] European Pat. Off. ........... 92203651

[51] Int. Cl.$^6$ .................... H02M 7/5387; H05B 37/00
[52] U.S. Cl. .................... 363/132; 315/200 R
[58] Field of Search ............... 363/34, 37, 123, 125, 363/131, 132; 315/200 R, 207, 208, 209 R, 224, DIG. 2, DIG. 7

[56] References Cited

U.S. PATENT DOCUMENTS

| | | | |
|---|---|---|---|
| 4,782,268 | 11/1988 | Fahnrich et al. | 315/200 |
| 4,935,672 | 6/1990 | Lammers et al. | 315/200 R |
| 4,965,493 | 10/1990 | Van Meurs et al. | 315/DIG. 5 |
| 5,063,331 | 11/1991 | Nostwick | 315/219 |
| 5,223,767 | 6/1993 | Kulka | 315/209 |
| 5,274,540 | 12/1993 | Maehara | 363/132 |
| 5,313,142 | 5/1994 | Wong | 315/205 |

FOREIGN PATENT DOCUMENTS 0541909  5/1993  European Pat. Off. ..... H05B 41/29

OTHER PUBLICATIONS

Isao Takahashi 'conference record of the 1990 ieee industry applications society meeting (part 2)' 12 Oct. 1990, Seattle, pp. 1289–1294.
Search Report.

*Primary Examiner*—Steven L. Stephan
*Assistant Examiner*—Matthew V. Nguyen
*Attorney, Agent, or Firm*—Edward Blocker

[57] ABSTRACT

The invention relates to a circuit arrangement suitable for high-frequency operation of a discharge lamp, provided with
- input terminals (1, 2) for connection to a low-frequency supply voltage source,
- a rectifier circuit (G) coupled to the input terminals for rectifying a low-frequency supply voltage supplied by the low-frequency supply voltage source,
- a DC-AC converter,
- a branch (22) of which a first end is connected to a point of the DC-AC converter at which a high-frequency voltage is present during lamp operation and of which a further end is coupled to the rectifier circuit,
- the branch being conductive at least for alternating current in both directions, and the further end of the branch being connected to a first input terminal,
- where by the amount of interference caused by the circuit arrangement is considerably reduced, while the circuit arrangement can be realized with a comparatively small number of components.

4 Claims, 1 Drawing Sheet

HIGH FREQUENCY DISCHARGE LAMP

BACKGROUND OF THE INVENTION

1. Field of the Invention

The invention relates to a circuit arrangement suitable for high-frequency operation of a discharge lamp, provided with

- input terminals for connection to a low-frequency supply voltage source,
- rectifying means coupled to the input terminals for rectifying a low-frequency supply voltage supplied by the low-frequency supply voltage source,
- a first branch comprising first capacitive means and connected to the rectifying means,
- a DC-AC converter coupled to the first capacitive means for generating a high-frequency current from a direct voltage present across the first capacitive means, and
- a further branch of which a first end is connected to a point of the DC-AC converter at which a high-frequency voltage is present during lamp operation and of which a further end is coupled to the rectifying means.

2. Description of the Prior Art

High-frequency operation of a discharge lamp in this connection is understood to mean operation at an operating frequency of approximately 10 kHz and higher. A low-frequency supply voltage source is understood to mean, for example, a substantially sinusoidal mains voltage with a frequency of, for example, 50 or 60 Hz.

Such a circuit arrangement is known from U.S. Pat. No. 4,782,268. The known circuit arrangement comprises a DC-AC converter consisting of a bridge circuit. The further branch comprises both inductive and capacitive means and in addition two diodes. A first end of the further branch is connected to a junction point of two switching elements forming part of the bridge circuit. A further end of the further branch is connected to an output of the rectifying means. It is achieved by means of the further branch that the circuit arrangement behaves like an ohmic resistance to a considerable degree during lamp operation. As a result, the circuit arrangement causes only a comparatively small amount of interference in the low-frequency supply voltage source and a high power factor is realised by the circuit arrangement during lamp operation.

A disadvantage of the known circuit arrangement is that, in addition to the diodes forming part of the rectifying means, further diodes are necessary, i.e. the two diodes in the further branch, for realising the favourable properties of the circuit arrangement as regards mains interference and power factor.

SUMMARY OF THE INVENTION

The invention has for its object inter alia to provide a circuit arrangement for the high-frequency operation of a discharge lamp with which a comparatively high power factor and only a comparatively small amount of mains interference can be realised during lamp operation, while the means by which these favourable properties are achieved comprise only a comparatively small number of components.

According to the invention, a circuit arrangement as described in the opening paragraph is for this purpose characterized in that the further branch is conductive for AC current in both directions and the further end of the further branch is connected to a first input terminal.

In a circuit arrangement according to the invention, the further branch is conductive for AC current in both directions (i.e. from the first end to the further end and vice versa) and contains no diodes. Since the further end of the further branch is connected to an input terminal, the further branch couples a point of the DC-AC converter at which a high-frequency voltage is present during lamp operation to an input of the rectifying means. It is achieved thereby that the diodes in the rectifying means not only rectify the low-frequency supply voltage but also perform a function which corresponds to that of the diodes in the further branch in the known circuit. As a result, a circuit arrangement according to the invention has favourable properties as regards interference in the supply voltage source and power factor, while the circuit arrangement can at the same time be realised with a comparatively small number of components. Thanks to this comparatively small number of components, the circuit arrangement is comparatively simple and therefore also comparatively easy to manufacture.

An advantageous embodiment of a circuit arrangement according to the invention is characterized in that the further branch comprises second capacitive means. The capacitive means in the further branch prevent a direct current from flowing through the further branch. If these capacitive means were absent, a discharge lamp operated by means of the circuit arrangement might pass a direct current under certain circumstances, whereby camphoreric effects could occur in the lamp. When the further branch is connected to a further input terminal via third capacitive means in this advantageous embodiment of a circuit arrangement according to the invention, the second capacitive means and the third capacitive means form a filter for suppressing supply mains interference. The second capacitive means in such an embodiment of a circuit arrangement according to the invention fulfil both the function of blocking direct current and the function of filtering out interference in the supply voltage mains.

A further advantageous embodiment of a circuit arrangement according to the invention is characterized in that the impedance of the further branch is substantially zero. Since the further branch in a circuit arrangement according to the invention contains no diodes, while it is not necessary in every embodiment to include second capacitive means in the further branch, the further branch may be realised as a conductive connection in this further advantageous embodiment, i.e. no components are included in the said branch. As a result, this further advantageous embodiment of a circuit arrangement according to the invention can be realised in a comparatively simple manner and at a comparatively low price.

A further embodiment of a circuit arrangement according to the invention is characterized in that the rectifying means comprise a voltage multiplier. When the amplitude of the low-frequency supply voltage is comparatively low compared with the operating voltage of a lamp operated with the circuit arrangement, it may be advantageous to cause the DC voltage present across the first capacitive means in the first branch to be comparatively high.

BRIEF DESCRIPTION OF THE DRAWING

Embodiments of the invention will be explained with reference to a drawing.

In the drawing.

DESCRIPTION OF THE PREFERRED EMBODIMENTS

Figure 1:
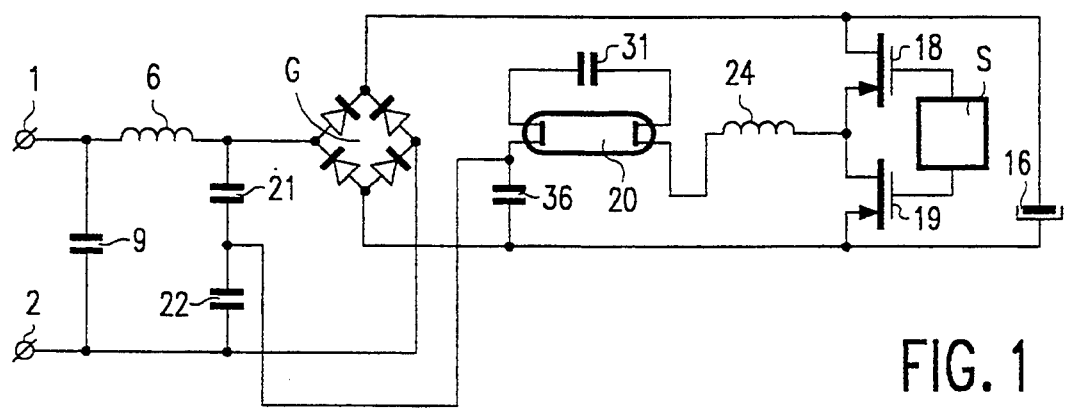
FIG. 1 shows an embodiment of a circuit arrangement according to the invention.

In FIG. 1, reference numerals 1 and 2 denote input terminals for connection to a low-frequency supply voltage source. The rectifying means are formed by a diode bridge G. The first capacitive means and the first branch in this embodiment are formed by capacitor 16. The DC-AC converter is formed by switching elements 18 and 19, control circuit S, coil 24, capacitor 31, and capacitor 36. A discharge lamp 20 is connected to the DC-AC converter. The further branch, which in this embodiment comprises capacitive means, is formed by capacitor 22. Capacitor 21 in this embodiment forms third capacitive means.

Input terminals 1 and 2 are interconnected by capacitor 9. Input terminal 1 is also connected to a first end of coil 6. A further end of coil 6 is connected to input terminal 2 through a series arrangement of capacitor 21 and capacitor 22. The further end of coil 6 is also connected to a further input of the diode bridge G, and input terminal 2 is connected to a further input of diode bridge G. A first output of the diode bridge G is connected to a further output of the diode bridge G via capacitor 16. Capacitor 16 is shunted by a series arrangement of the two switching elements 18 and 19. A control electrode of switching element 18 and a control electrode of switching element 19 are connected to respective outputs of control circuit S. A junction point of switching element 18 and switching element 19 is connected to a first end of coil 24. A further end of coil 24 is connected to a first electrode of the discharge lamp 20. A further electrode of the discharge lamp 20 is connected to a first .side of capacitor 36. A further side of capacitor 36 is connected to a side of capacitor 16. The discharge lamp 20 is shunted by capacitor 31. A junction point of the discharge lamp 20 and capacitor 36 in this embodiment forms the first end of the further branch. The further end of the further branch is input terminal 2.

The operation of the circuit arrangement shown in FIG. 1 is as follows.

When the input terminals 1 and 2 are connected to a supply voltage source which supplies a low-frequency supply voltage, this low-frequency supply voltage is rectified by the diode bridge G, whereby a DC voltage approximately equal to the maximum amplitude of the low-frequency supply voltage is present across capacitor 16. At the same time, the control circuit S renders the two switching elements alternately conducting and non-conducting with high frequency. As a result of this, a high-frequency current flows through the branch formed by coil 24, discharge lamp 20, capacitor 31 and capacitor 36, and a high-frequency voltage is present at a common junction point of capacitor 36 and discharge lamp 20. The fact that this common junction point is connected to input terminal 2 through the further branch formed by capacitor 22 achieves that the low-frequency supply voltage source supplies current during time intervals in which the instantaneous amplitude of the low-frequency supply voltage is lower than the voltage across the capacitor 16. This means that the amount of interference (conducted interference) caused by the circuit arrangement is considerably less than if the circuit arrangement were not provided with the further branch formed by capacitor 22. Capacitor 9 and coil 6 together form an input filter for suppressing high-frequency interference. In the present embodiment, the series arrangement of capacitor 21 and capacitor 22 also serve as a filter for suppressing interference.

Figure 2:
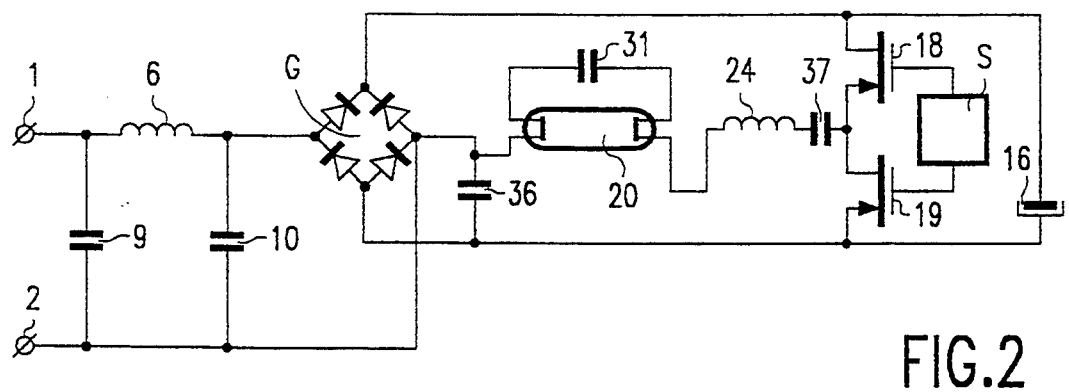
FIG. 2 shows a further embodiment of a circuit arrangement according to the invention.

In the circuit arrangement shown in FIG. 2, components corresponding to components of the circuit arrangement shown in FIG. 1 are given the same reference letters or numerals. The circuit arrangement shown in FIG. 2 differs from that shown in FIG. 1 in that the series arrangement of capacitor 21 and capacitor 22 is replaced by capacitor 10, and in that a capacitor 37 is included between a common junction point of the switching elements and the first end of coil 24. In addition, the circuit arrangement shown in FIG. 2 differs from that shown in FIG. 1 in that the further branch of the circuit arrangement shown in FIG. 2 comprises no capacitor, but is formed by a conductive connection whose impedance is substantially zero between input terminal 2 and the junction point of the discharge lamp 20 and the capacitor 36.

The operation of the circuit arrangement shown in FIG. 2 is similar to the operation of the circuit arrangement shown in FIG. 1.

When the input terminals 1 and 2 are connected to a supply voltage source which supplies a low-frequency supply voltage, this low-frequency supply voltage is rectified by diode bridge G so that a DC voltage is present across capacitor 16, and the control circuit S renders the two switching elements alternately conducting and non-conducting with high frequency. As a result of this, a high-frequency current flows through the branch formed by capacitor 37, coil 24, discharge lamp 20, capacitor 31 and capacitor 36, and a high-frequency voltage is present at a common junction point of capacitor 36 and discharge lamp 20. The presence of the further branch achieves that the low-frequency supply voltage source supplies current during time intervals in which the instantaneous amplitude of the low-frequency supply voltage is lower than the voltage across capacitor 16. This means, as it does for the circuit arrangement shown in FIG. 1, that the amount of interference (conducted interference) caused by the circuit arrangement is considerably less than if the circuit arrangement were not provided with the further branch. Capacitor 9 and coil 6 together form an input filter for suppressing high-frequency interference also in this embodiment. Capacitor 10 again serves as a filter for suppressing interference. Capacitor 37 prevents a direct current from flowing through the further branch.

Figure 3:
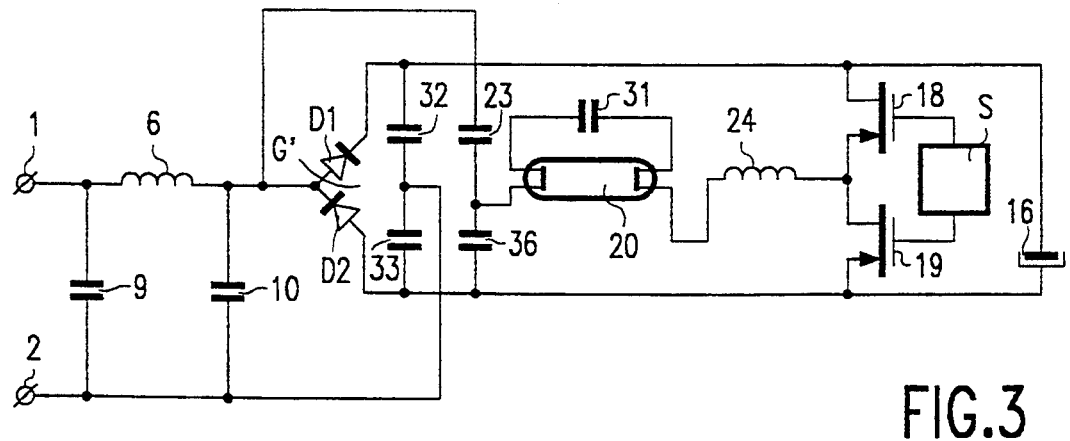
FIG. 3 shows an alternative embodiment of a circuit arrangement according to the invention.

In the alternative embodiment of a circuit arrangement according to the invention shown in FIG. 3, components corresponding to the components of the circuit arrangement shown in FIG. 1 are given the same reference letters or numerals. The circuit arrangement shown in FIG. 3 differs from that shown in FIG. 1 in that the series arrangement of capacitor 21 and capacitor 22 is replaced by capacitor 10 and in that the rectifying bridge G is replaced by a voltage doubler G' built up from diodes D1 and D2 and capacitors 32 and 33.

The circuit arrangement shown in FIG. 3 also differs from that shown in FIG. 1 in that the further branch of the circuit arrangement shown in FIG. 3 is formed by capacitor 23 which interconnects input terminal 2 and the common junction point of the discharge lamp 20 and the capacitor 36.

The operation of the circuit arrangement shown in FIG. 3 is similar to the operation of the circuit arrangements shown in FIGS. 1 and 2 and is accordingly not described in detail. Since the diode bridge G is replaced by the voltage doubler G', the voltage across capacitor 16 is approximately twice as high during stationary lamp operation. This may be desirable when the maximum amplitude of the low-frequency supply voltage is comparatively low. It was also found for the circuit arrangement shown in FIG. 3 that the further branch achieves a considerable interference suppression.

For practical embodiments of the circuit arrangements shown in FIGS. 1 and 2, with which a low-pressure mercury discharge lamp with a rated power of approximately 18 W was operated and which were supplied with a substantially sinusoidal supply voltage with a frequency of approximately 50 Hz, it was found that the amount of interference caused in the supply voltage source was considerably lower than the amount allowed by IEC/552, part II.

I claim:

1. A circuit arrangement suitable for high-frequency operation of a discharge lamp, comprising:
    input terminals for connection to a low-frequency supply voltage source,
    an input filter coupled to the input terminals for suppressing high-frequency interference of the circuit arrangement with the low-frequency supply voltage source,
    rectifying means having inputs coupled to the input filter for rectifying a low-frequency supply voltage supplied by the low-frequency supply voltage source,
    a first branch comprising first capacitive means connected across outputs of the rectifying means,
    a DC-AC converter coupled to the first capacitive means for generating a high-frequency current from a direct voltage present across the first capacitive means, and
    a further branch of which a first end is connected to a point of the DC-AC converter at which a high-frequency voltage is present during lamp operation and of which a further end is coupled to the rectifying means,
    wherein the further branch is conductive for AC current in both directions and the further end of the further branch is connected to a junction between the input filter and one of the inputs of the rectifying means.

2. A circuit arrangement as claimed in claim 1, wherein the further branch comprises second and third capacitive means connected in series across the inputs of the rectifying means, a junction point between the second and third capacitive means being the first end of the further branch.

3. A circuit arrangement as claimed in claim 1, wherein the further branch is a substantially zero impedance electrical connection between a point of the DC-AC converter at which a high-frequency voltage is present during lamp operation and one of the inputs of the rectifying means.

4. A circuit arrangement as claimed in claim 1, wherein the rectifying means is a voltage multiplier and the further branch comprises second capacitive means connecting a point of the DC-AC converter at which a high-frequency voltage is present during lamp operation to one of the inputs of the rectifying means.

* * * * *